United States Patent [19]
Greenstein et al.

[11] Patent Number: 5,485,843
[45] Date of Patent: Jan. 23, 1996

[54] ACOUSTIC ARRAYS AND METHODS FOR SENSING FLUID FLOW

[75] Inventors: Michael Greenstein, Los Altos; Hewlett E. Melton, Jr., Sunnyvale; King-Wah W. Yeung, Cupertino, all of Calif.

[73] Assignee: Hewlett Packard Company, Palo Alto, Calif.

[21] Appl. No.: 104,510

[22] Filed: Aug. 9, 1993

[51] Int. Cl.⁶ ....................................................... A61B 8/06
[52] U.S. Cl. ....................................................... 128/661.09
[58] Field of Search ............. 128/660.07, 661.07–661.1, 128/662.04

[56] References Cited

U.S. PATENT DOCUMENTS

| | | | |
|---|---|---|---|
| 4,307,613 | 12/1981 | Fox | 128/661.01 X |
| 4,431,936 | 2/1984 | Fu et al. | 128/662.04 X |
| 4,493,216 | 1/1985 | Hassler | 128/661.1 X |
| 4,586,512 | 5/1986 | Do Huu et al. | 128/661.01 X |
| 4,641,660 | 2/1987 | Bele | 128/661.01 |
| 4,873,985 | 10/1989 | Nakajima | 128/661.1 X |
| 5,186,175 | 2/1993 | Hirama et al. | 128/661.01 |

Primary Examiner—Francis Jaworski

[57] ABSTRACT

Piezoelectric elements in a transducer array are individually excited and used to sense the back-scattered signal from fluid flowing within an interrogation volume. The array is preferably a 2-D phased array with a pitch no greater than one-half the acoustic wavelength of the interrogation signal. By activating the transducer elements as a pattern of concentric rings as viewed from a point of interrogation, and by suitable phasing and range-gating of an interrogation signal, a substantially spherical interrogation volume (SIV) is created. The return signal from the SIV provides an isotropic indication of the speed of flow of the fluid. The focussing distance along an interrogation axis can be changed by changing either the size of the aperture created by the pattern of activated elements or their relative phasing. The interrogation direction can be angled off-axis by activating the transducer elements in a pattern of concentric ellipses. The interrogation axis itself may also be moved off-center by translating the pattern of activated elements. By deforming the activation pattern of the transducer elements from concentric rings to concentric ellipses, the long axes of ellipsoidal interrogation volumes (EIV) can be rotated. The back-scattered signals from these rotated ellipsoidal interrogation volumes indicate the direction of fluid flow.

17 Claims, 13 Drawing Sheets

ACOUSTIC ARRAYS AND METHODS FOR SENSING FLUID FLOW

BACKGROUND OF THE INVENTION

1. Technical Field

This invention involves an array of ultrasonic transducer elements configured to sense the speed and direction of flow of a fluid, such as blood in a coronary artery, as well as a method for controlling the array to produce different ultrasonic interrogation volumes.

2. Description of the Related Art

The measurement of blood flow in the coronary arteries is a well-known technique for diagnosing coronary artery diseases. There are, consequently, many different devices and methods for determining this blood flow.

One common sensing technique involves the use of ultrasound. Using this technique, ultrasound is directed into the body of the patient and tiny particles such as red blood cells, which are suspended in the blood, scatter the ultrasonic energy back towards the transducer. The transducer then converts the back-scattered ultrasonic energy into an electrical signal that is processed in some known manner to determine an estimate of the flow.

One great advantage of ultrasonic sensing is that it is non-invasive, meaning that it can be carried out without having to cut or insert anything into the patient's body. A problem one faces when using existing ultrasonic flow measurement techniques, however, is that measurements are often made through the "keyhole" between the ribs in a transthoracic scan, where the coronary arteries typically twist over the curved surface of the moving heart wall. The direction of the blood in the arteries or the motion of the heart wall with respect to the line-of-sight of the ultrasonic beam is therefore usually not known. This is a serious problem for the many common techniques that use the principle of Doppler shift.

The Doppler principle used in existing techniques for calculating flow velocity v based on the frequency shift of ultrasonic waves scattered by moving red cells can be expressed as follows:

$$f_d = 2(v/c)f_0 \cdot \cos\theta,$$

in which $f_0$ is the frequency of the ultrasonic wave sent into the body, v is the flow velocity, c is the speed of sound, $\theta$ is the angle between the line-of-sight direction of the beam and the flow, and $f_d$ is the detected frequency shift of the signal that returns to the transducer. As long as $\cos\theta$ is not equal to zero, the frequency shift will increase with increasing flow velocity.

As the equation shows, it is not possible using conventional Doppler techniques to detect any frequency shift if $\theta$ equals 90°, that is, if the flow is perpendicular to the line-of-sight of the ultrasonic transducer, regardless of how fast the blood is flowing. Police officers who use radar guns to check for speeders are a more common example of this problem: the officers cannot position themselves at right angles to the cars being checked because the typical radar gun uses the same Doppler principle and would tell the disbelieving police officers that the cars were not moving at all.

If the direction of flow is at an angle of 60° from the line-of-sight of the ultrasonic transducer, the indicated frequency shift will be only half what it would be if the flow and the line-of-sight were parallel. In general, the angle $\theta$ is not known beforehand. In the context of blood-flow measurements, what is needed is therefore an ultrasonic sensing device that is substantially isotropic, that is, that can consistently and accurately measure the speed of flow independent of the direction of flow. Alternatively, a sensing device is needed that can determine the direction of flow so that Doppler measurements can be adjusted accordingly. This invention provides such a device, as well as a method for controlling it.

SUMMARY OF THE INVENTION

The invention provides a two-dimensional array of ultrasonic transducer elements that can be individually excited and can sense the back-scattered signal from fluid that is flowing within an interrogation volume. The pitch of the elements in the array is preferably no greater than one-half the acoustic wavelength of the interrogation signal so as to enable generation of the interrogation volume as either a sphere or an ellipse.

By activating the transducer elements as a pattern of concentric circular rings as viewed from a point of interrogation, and by suitable phasing and range-gating of an interrogation signal, a substantially spherical interrogation volume (SIV) is created. The back-scattered ultrasonic signal from the SIV makes possible an isotropic, that is, direction-independent, measurement of the speed of flow of the fluid.

The distance from the array along an interrogation axis that the interrogation volume is focussed can be changed by changing the size of the aperture created by the pattern of activated elements and their relative timing. The interrogation direction can be changed so as to be off-axis by activating the transducer elements in a pattern of concentric ellipses. The interrogation axis itself may also be moved off-center of the array by a translation of the pattern of activated transducer elements.

By deforming the activation pattern of the transducer elements from concentric rings to concentric ellipses, the invention also generates ellipsoidal interrogation volumes whose long axes can be rotated. The back-scattered signal from these ellipsoidal interrogation volumes indicates the direction of fluid flow within the volumes.

DETAILED DESCRIPTION

This invention provides a system and a method for determining the speed and direction of flow of a fluid within any conduit as long as the fluid contains some form of particles or discontinuities that are able to scatter ultrasonic waves. The invention is, however, particularly well suited for solving the problems, described above, that are connected with determining the flow of blood within a blood vessel such as a coronary artery, and also within other organs of the body. Accordingly, the discussion below is directed to this application.

Figure 1:
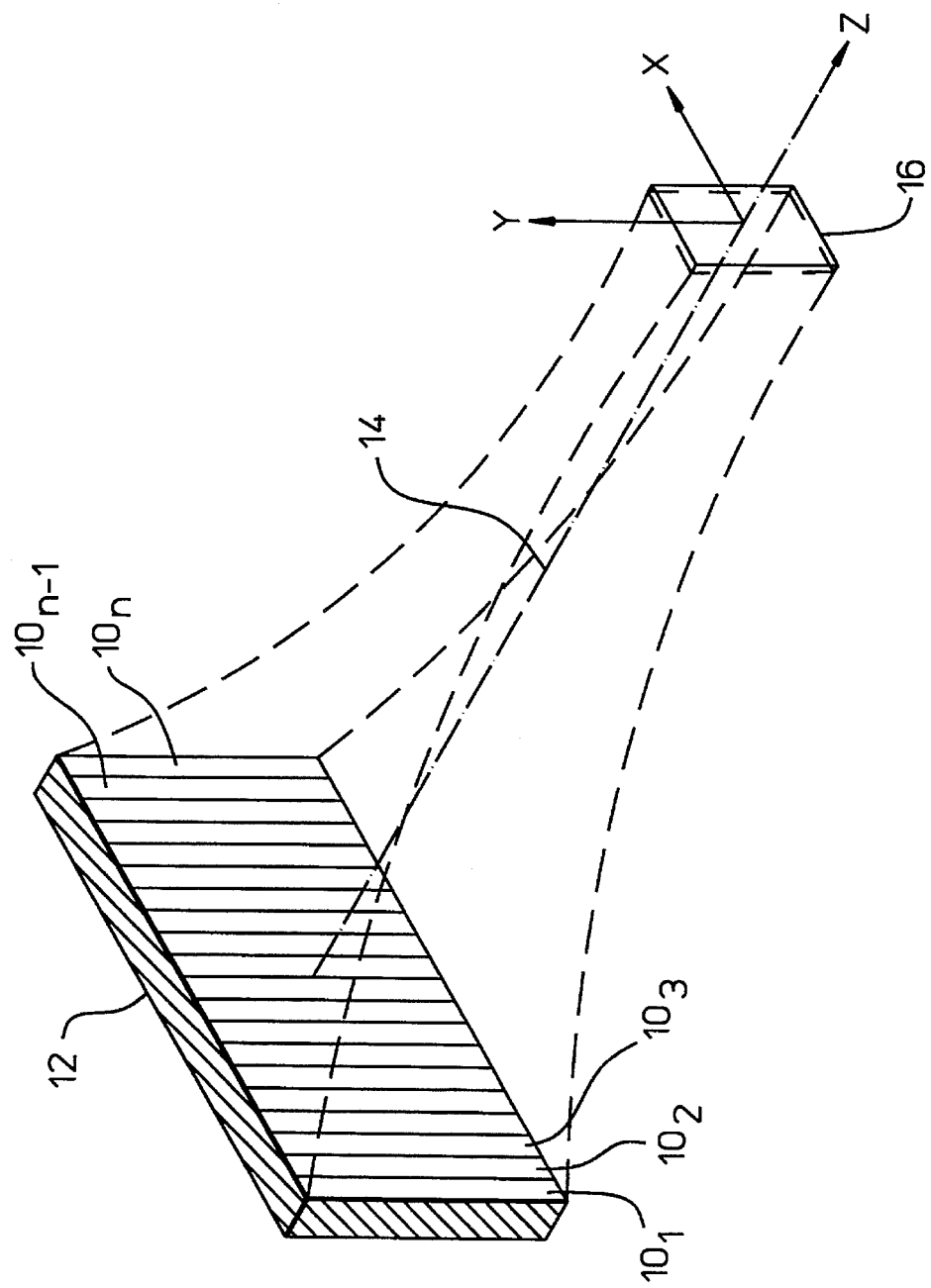
FIG. 1 illustrates an anisotropic interrogation volume (AIV) generated by a 1-D phased array of ultrasonic transducer elements as found in the prior art.

FIG. 1 illustrates the principle of operation of a conventional one-dimensional phased array of ultrasonic transducer elements that are used to estimate fluid flow. In such devices, several ultrasonic transducer elements $10_1$, $10_2$, $10_3$, . . . , $10_{n-1}$, $10_n$, are mounted or manufactured as a parallel array 12. The transducer elements are individually excited using known circuitry and techniques to generate a pattern of ultrasonic waves that propagate principally along an interrogation direction 14, which can be steered over a range of angles relative to the normal to the plane of the phased array 12.

The signals from the various transducer elements $10_1$, . . ., $10_n$, are phased using known techniques so that they focus to create a region of maximum constructive interference where one wishes to measure the fluid flow. This region in known as the interrogation volume. In FIG. 1, the anisotropic interrogation volume (AIV) created by such a conventional 1-D phased array 12 is indicated as the thin, substantially rectangular AIV region 16. The AIV follows from the fact that typical conventional ultrasound transducers generate an interrogation beam whose lateral and axial dimensions are unequal.

Existing ultrasonic imaging devices such as the one illustrated in FIG. 1 employ bursts of ultrasonic waves with the shortest possible duration in order to achieve high range resolution in the image. Because the lateral dimensions of the ultrasonic beam are limited by the physical dimensions of the transducer elements $10_1$, $10_2$, . . ., $10_n$, these techniques often cause the anisotropism, that is, the direction-dependence, of the interrogation volume 16.

In FIG. 1, the boundaries of the ultrasonic beam are shown as the −6 dB boundaries of signal strength and the range, azimuth, and elevation of the beam, as determined here by the −6 dB boundaries, are not equal. The range dimension (z-axis) is typically less than 1 mm due to the very short pulse length. The azimuthal direction (x-axis) is obtained by dynamic electronic focussing and is usually about 3 mm. The elevational direction (y-axis) is obtained by static mechanical focussing and is typically less than 5 mm. As is described below, the invention eliminates the need for mechanical focussing yet still allows for much more controllable focussing and beam forming, as well as for isotropic spherical interrogation volumes.

The anisotropism of the conventional interrogation volume causes the signal returned to the transducer to have characteristics that depend on the orientation of the interrogation beam and the direction of flow of the fluid to be measured. In other words, if the fluid is flowing in the x-direction, the system will indicate that its speed is different than if it were flowing in the z-direction, even if the speed is the same. The cause of this problem is discussed above when it comes to the Doppler techniques commonly used.

Figure 2:
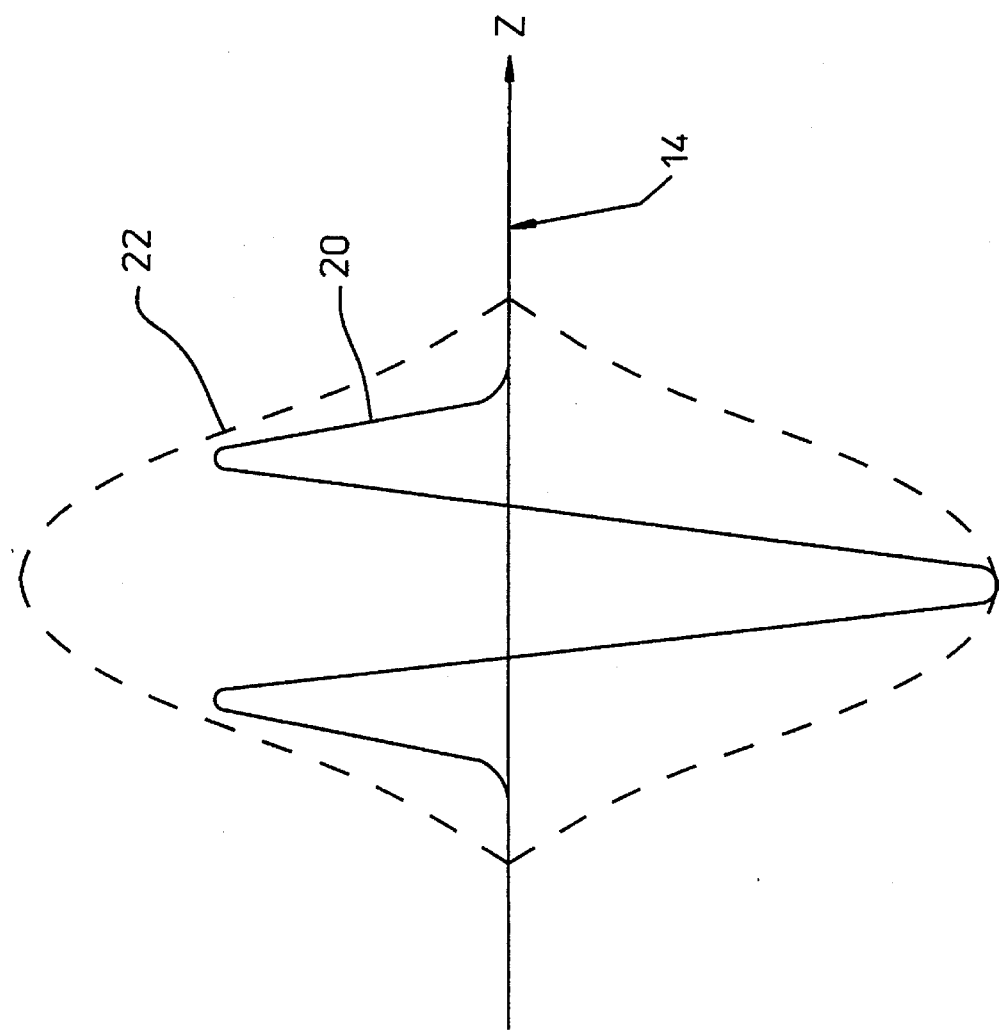
FIG. 2 illustrates a wave and envelope for a conventional anisotropic interrogation volume (AIV).

FIG. 2 shows a wave and envelope along the range direction (z-axis) used to produce an AIV. In order to increase axial image resolution, a typical conventional imaging transducer with an AIV has only one or two cycles within the interrogation volume. In FIG. 2, 1½ cycles of the interrogation pulse 20 define the wave envelope 22 of the AIV.

As is well known, the pulse 20 will be scattered back towards the transducer array 12 (FIG. 1) by each of the particles within the fluid, such as red blood cells in an artery. The back-scattered pulses thereby undergo Doppler shift. Using the Doppler relationship shown above, the degree of frequency shift is then used to calculate fluid flow. As is discussed above, however, the degree of frequency shift in such conventional systems depends on the angle between the direction of fluid flow and the interrogation direction 14.

In ultrasonic flow-measuring systems, the waves of ultrasound are typically transmitted at a constant pulse repetition frequency (PRF); this is also preferred according to this invention since it leads naturally to constant sampling rates for the return signal. The signal that returns to the ultrasonic transducer, either at a fixed time delay or, equivalently, at a fixed distance from the transducer, after the generation of each burst, is produced by the scattering of a large number of particles that lie inside the interrogation volume. In the interrogation volume, the envelope of the ultrasonic signal along the direction of wave propagation is primarily determined from the envelope of the burst (the length) as a function of time; the cross-sectional area is determined by the transducer transmit and receive beam forming in a plane perpendicular to the propagation direction.

According to the invention, the length of the interrogation volume is generated so that it is the same as the width and height of the beam. The interrogation volume is then approximately spherical. The inventors have discovered two particular types or measures of "sphericity" for the interrogation volume or its wave envelope that make possible direction-independent measurement of flow speed and direction.

In another co-pending application, "Ultrasonic Frequency-Domain System and Method for Sensing Fluid Flow," (U.S. filing date: 9 Aug. 1993), the inventors disclose a method according to which "spherical" is determined on the basis of mean power. According to this method, a sphere of intensity I and with a radius R is "replaced" by an interrogation volume whose range dimension is equal to its lateral dimensions and has the same mean power. The Doppler bandwidth of the back-scattered return signal is then sensed, evaluated, and scaled by a constant proportionality factor. The scaled Doppler bandwidth value is equal to the flow speed, independent of the direction of flow.

In another application, "Ultrasonic Time-Domain Method for Sensing Fluid Flow," (U.S. filing date: 9 Aug. 1993), the inventors disclose a method according to which "spherical" means that components of the mean square gradient of the interrogation wave envelope are substantially equal. According to this method, the interrogation volume is stationary and is generated with a steady wave envelope (there are no acoustic sources or sinks in the interrogation region). Furthermore, the wave envelope of the interrogation volume is generated in such a way that the components of the mean square gradient of the interrogation wave envelope are substantially equal for any set of orthogonal axes whose origin is the center of the wave envelope. The mean square rate of change of the envelope of the back-scattered return signal is then evaluated and scaled by a constant proportionality factor. The scaled mean square rate of change is equal to the flow speed, independent of the direction of flow.

In order to determine flow direction according to these methods, the spherical interrogation volume (using the corresponding definition of "sphericity") is deformed to be substantially ellipsoidal, with a long axis. The inventors have found that the mean square rate of change of the envelope of the return signal and the Doppler bandwidth reach a minimum when the long axis of the ellipsoidal interrogation volume or wave envelope is parallel to the direction of flow. The long axis of the interrogation volume or wave envelope is then rotated according to any known optimization routine until the minimum value is reached; flow direction is then indicated as being in the same as the direction of the long axis of the ellipsoid.

For both of these methods—using mean square rate of change of the envelope of the return signal and using the Doppler bandwidth of the return signal—a suitable acoustic transducer is required for generating the various interrogation volumes. This invention provides such a transducer.

Note that the interrogation volume and its wave envelope are a function of both the transmitted and received ultrasonic beam properties.

Figure 3:
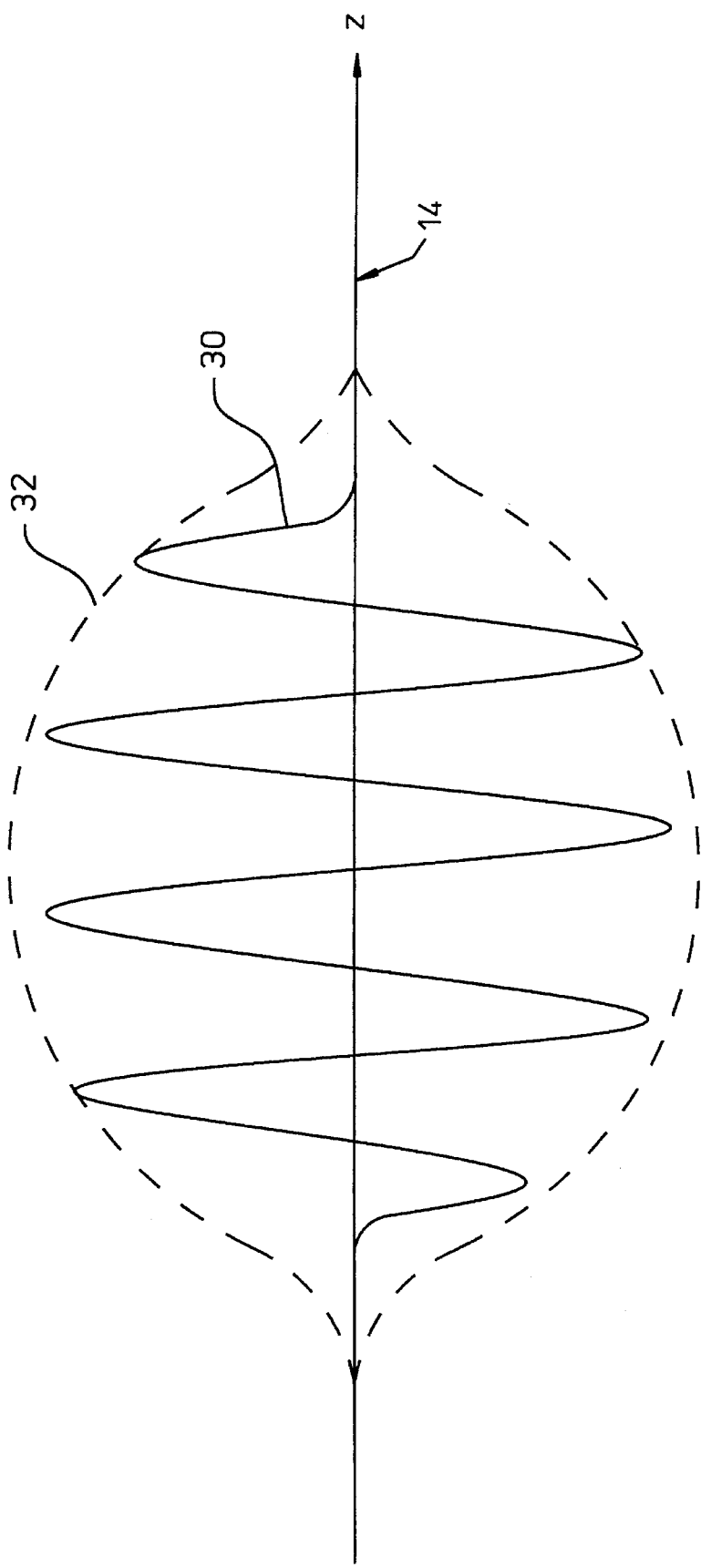
FIG. 3 illustrates a wave and envelope for a spherical interrogation volume (SIV) according to the invention.

FIG. 3 illustrates a wave and envelope for an SIV along the range direction. Four cycles of the pulse 30 define the wave envelope 32 along the range dimension of the SIV. In order to give the interrogation wave envelope the proper curvature along the z-axis, the amplitude of the pulse must increase from a minimum near the forward and rearmost points of the SIV to a maximum near the center of the SIV. The electrical excitation signals needed to phase the output signals from the various transducer elements so as to create the waveform shown in FIG. 3 can be determined by experiment or by theoretical calculations based on a knowledge of the physical properties of the chosen transducer elements in any given application.

Figure 4:
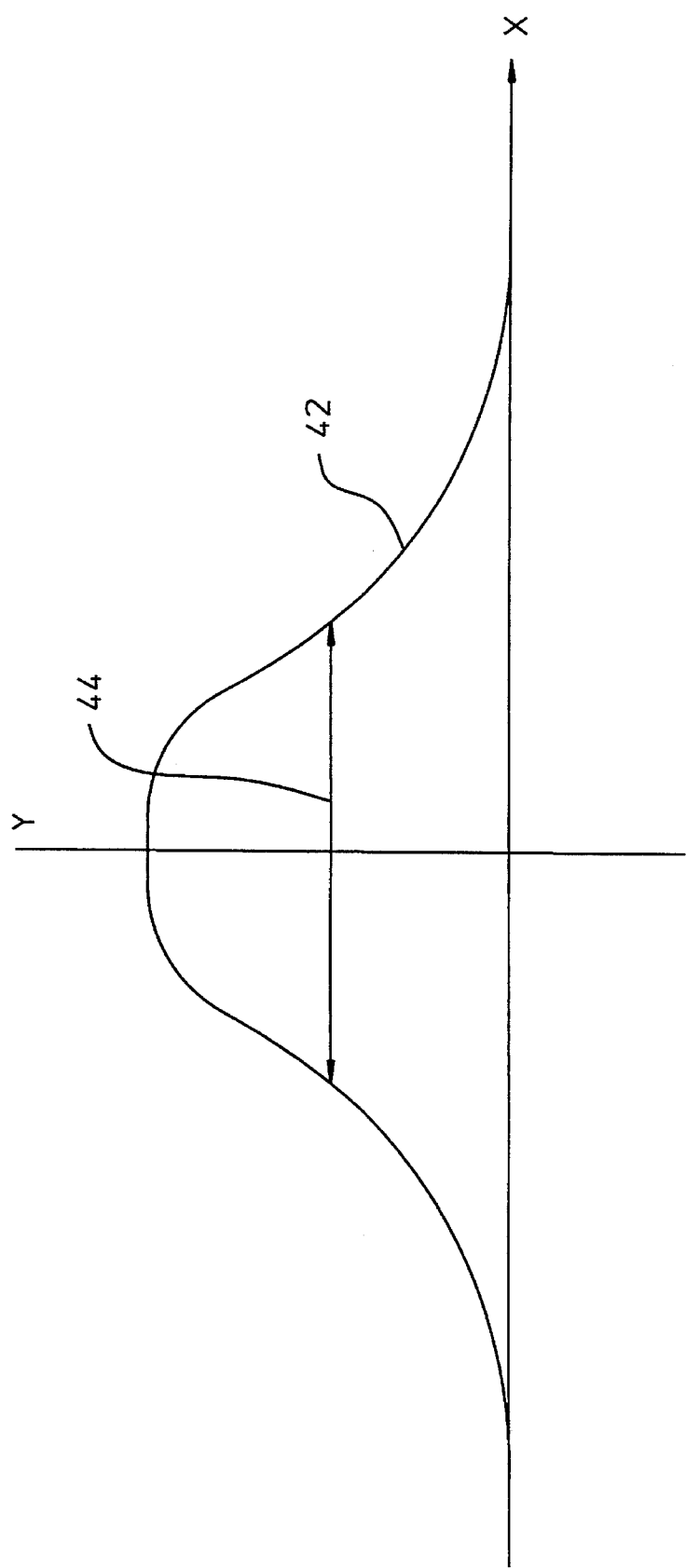
FIG. 4 illustrates a wave envelope with a −6 dB (50%) boundary for a SIV and an AIV along a lateral direction.

FIG. 4 illustrates a wave envelope for both an AIV and a SIV along a lateral direction. As FIG. 4 shows, the beam width for both interrogation volumes is limited by the focussing capability of the transducer. The double arrow 44 indicates the −6 dB width of the wave envelope of the interrogation volume.

It will typically not be possible to create a perfectly spherical interrogation volume; rather, the interrogation volume may have a "tail" or "lip" along one or more of the axes. In general, however, as long as the interrogation volume is substantially spherical (depending on the definition used in a particular implementation), the flow measurements will not be distorted significantly; in any event, the substantially spherical interrogation volume according to the invention will provide much greater direction independence than anisotropic interrogation volumes used in the prior art.

Experiments have indicated, for example, that a sufficiently spherical interrogation volume can be generated by creating a wave envelope with a Gaussian range profile of appropriate width. One should keep in mind that a spherical interrogation volume is a composite function of both the transmit and receive beam properties.

Figure 5:
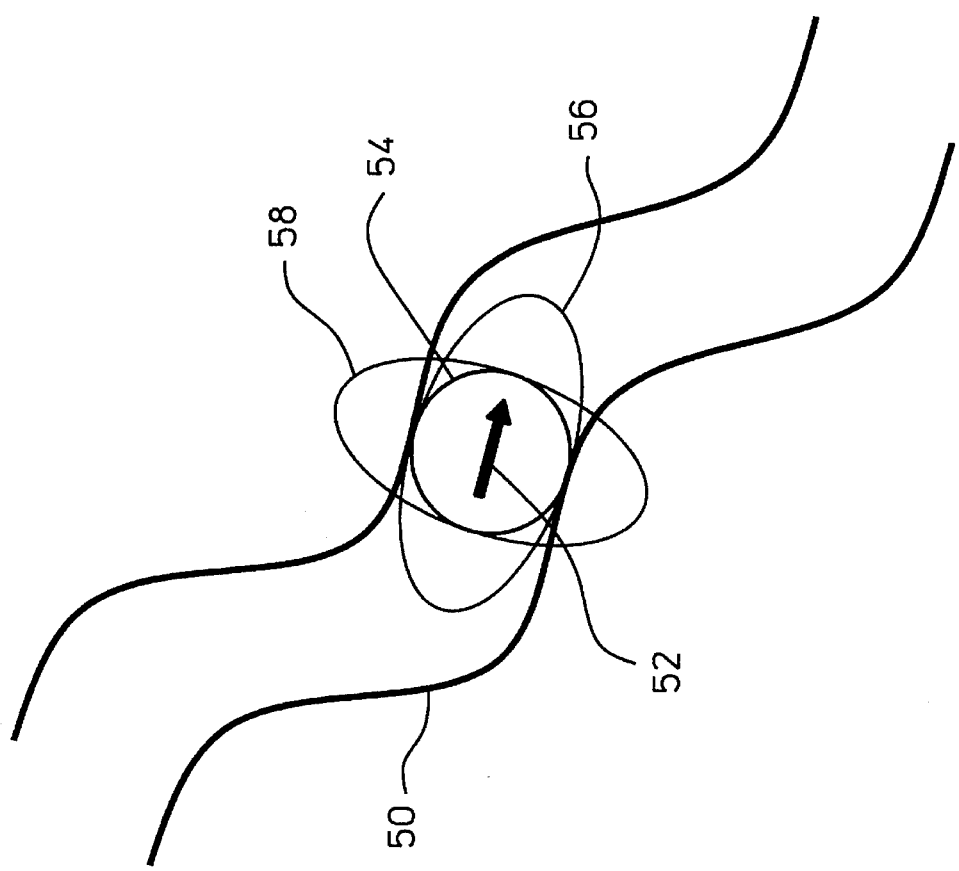
FIG. 5 illustrates a spherical interrogation volume in a blood vessel and two ellipsoidal interrogation volumes used to determined the direction of blood flow.

FIG. 5 illustrates the SIV according to the invention and also illustrates the method according to the invention for determining the direction of flow of blood within an artery 50. The local direction of flow of blood within the artery 50 is indicated by the arrow 52. FIG. 5 also shows a spherical interrogation volume 54 with the properties described above, which is focussed within the artery 50.

If the boundary of the interrogation volume is deformed so that the interrogation volume is ellipsoidal, a variation will be induced into the return signal so that the interrogation volume will become direction-dependent. If the measured mean square rate of change of the envelope of the back-scattered return signal is used to measure flow speed (with an SIV), this mean square rate will form a direction-indicating variable that is a function of the flow speed (which can be assumed to be constant during the measurement) and the angle between the long axis of the ellipsoid and the direction of flow. If the measured Doppler bandwidth of the return signal is used to measure the flow speed (with an SIV), the measured bandwidth will form the direction-indicating variable. In both cases, the value of the direction-indicating variable decreases as the direction of flow of the scattering particles within the fluid becomes more parallel to the long axis of the ellipsoid.

In FIG. 5, one ellipsoidal interrogation volume (EIV) 56 is shown with its long axis closely aligned with the direction of blood flow 52 while another EIV 58 is shown with its long axis nearly perpendicular to the direction of flow 52. The direction-indicating variable used in the particular implementation from the nearly perpendicular EIV 58 will have a much larger value than it will from the nearly aligned EIV 56.

This invention takes advantage of this phenomenon and provides a method for determining the direction of blood flow within an interrogation volume as well as (or instead of) the magnitude of flow of the blood in the interrogation volume. If one first wishes to measure the flow magnitude, the ultrasonic array is first configured and excited so as to produce the SIV as described above and to focus it within the artery at a desired point of measurement.

As is well known, the ultrasonic signal that is back-scattered from within the interrogation volume is reconverted into an electrical signal because of the piezoelectric characteristics of the transducer elements, one or more of which may be used for the reconversion. Conventional processing circuitry is then used to sense and sample the analog signal from the selected transducer elements and to convert the signal into a digital form suitable for use in numerical calculations. The circuitry accumulates these measured values and calculates the value of the direction-indicating variable in order to determine flow magnitude using appropriate corresponding methods (described in the inventors' applications, mentioned above).

The SIV is then "deformed" into an EIV by changing the phasing of the various transducer elements in the array used to generate the ultrasonic signal. Of course, one may also choose to forego the SIV step or to perform it last, in which case one generates the EIV at the start. The eccentricity of the EIV may be chosen by experiment or through calculations so that there is a large enough change in the direction-indicating variable as the ellipsoid is rotated.

In general, the greater the eccentricity of the ellipsoid is, the greater will be the induced variation in the return signal; the ability to detect when the long axis of the now anisotropic, EIV is aligned with the direction of flow, will also increase. The physical configuration of the transducer array and the different possibilities for changing the relative phases of the various transducer signals will limit one's choices of eccentricity for the EIV's. If the center of the ellipsoid is at a region where there is great curvature in the artery, the long axis itself may extend over a region in which the direction of blood flow changes radically.

The ellipsoidal interrogation volumes preferably have the same center of focus as the SIV itself. This ensures not only that the same region of the artery is being measured, but also that the determination of flow direction will be from the same point as the magnitude determination made using the SIV.

The direction-indicating variable for EIV's with the same center as the SIV (or as each other) is a function of the direction of the long axis of the ellipsoid and of the velocity of blood flowing through the EIV. Let $\bar{x}'=(x', y', z')$ be the direction of the long axis of the ellipsoidal interrogation volume.

Assume further that the flow velocity through the interrogation volume remains substantially constant as the EIV is rotated about its center point. This means that the direction-indicating variable is a function of the long axis direction alone.

By changing the phasing of the transducer array, the long axis of the EIV may be rotated about the center point of the ellipsoid. As the ellipsoid is rotated, the value of the direction-indicating variable will itself change and will reach a minimum when the long axis is parallel to the direction of flow. Any of a large number of known numerical optimization techniques, such as the Newton-Raphson techniques, may be used to control the manner in which the long axis is rotated in order to determine which orientation gives the minimum value for the direction-indicating variable. If the optimization method chosen requires one or more starting values for the vector that defines the long axis, these may be generated according to any known method, including simple random selection or arbitrary incremental changes in some predetermined direction.

As is mentioned above, known numerical techniques may also be used to calculate the value of the direction-indicating variable for any given interrogation volume. In order to determine the value, however, it will normally be necessary to sense many return signals in order to accumulate enough data points values to get a reliable estimate of the direction-indicating variable. The speed at which one can accumulate measurements will typically be the same as the pulse rate of the ultrasonic transducer array itself. For each of the ellipsoidal interrogation volumes, it will therefore be necessary to hold the volume fixed long enough to accumulate a sufficient number of measurements before taking the next step in the optimization routine, that is, before moving the EIV to a new orientation. The proper speed at which one rotates the ellipsoidal interrogation volumes may be determined by experiment and by incorporating any prior knowledge of the flow characteristics of the fluid.

Once the minimum value of the direction-indicating variable is sensed, the direction of flow may be assumed to be the same as the direction of the long axis of the ellipsoid that provided the minimum value. Since this direction is known, as well as the center point of the ellipsoid (the focal point of the interrogation volume), one will have determined the direction of flow in that interrogation volume. If one has already measured this same region using the spherical interrogation volume, one will also have an accurate measure of the flow velocity. Of course, since the ellipsoidal interrogation volumes may be used to determine direction of flow (and thus the angle between the direction of flow and the line of sight or interrogation direction of the transducer array), normal Doppler techniques may then be applied regardless of the SIV in order to get an estimate of the flow.

This invention provides a transducer that is uniquely suited to generate both spherical and ellipsoidal interrogation volumes and to implement these methods for determining flow speed and direction.

Figure 6:
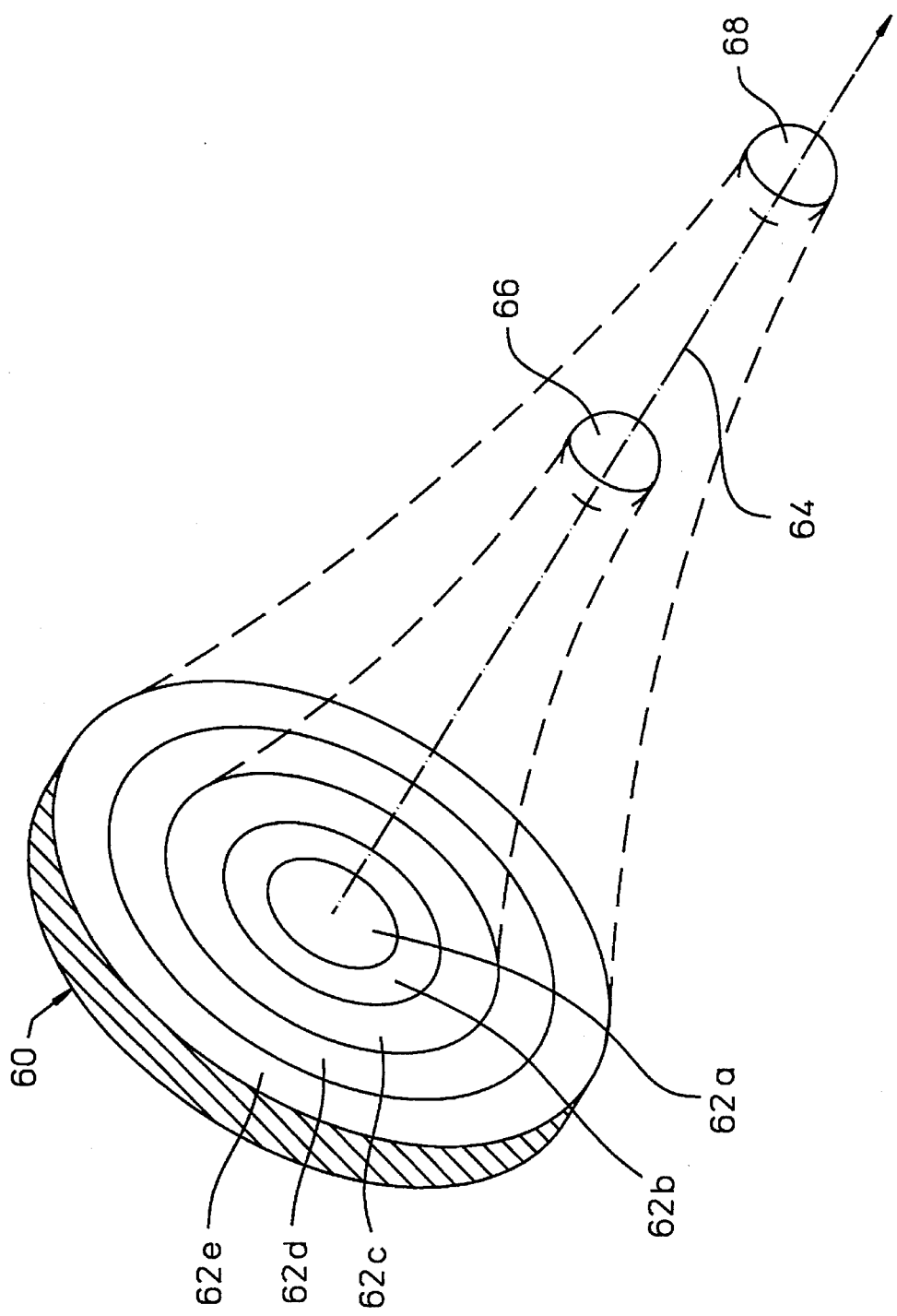
FIG. 6 illustrates an annular array of ultrasonic transducer elements that can be used to generate the SIV according to the invention.

FIG. 6 illustrates an array 60 of annular piezoelectric ultrasonic transducer elements 62a, 62b, 62c, 62d, and 62e. In the illustrated example, five annular transducer elements are shown, but more or fewer transducer elements may be used depending on the needs of any given application. For example, increasing the number of transducer elements while keeping the diameter of the array constant will in general increase the range over which equal-size spherical interrogation volumes may be produced, but it will also increase the complexity of the circuitry that excites and phases the various transducer elements. By increasing the diameter of the array 60, one creates a larger aperture and it then becomes possible to focus the interrogation volume farther away.

In the simplest case, the surface of the array 60 is substantially flat, although it is also possible to have a concave array and still be able to create a spherical interrogation volume. The annular array 60 generates interrogation volumes that are focussed on the line of the interrogation direction 64, which is substantially perpendicular to the array 60 and passes through its center point. The focal distance of the array 60 can be adjusted in a known manner by changing the number of transducer rings 62a–62e that are excited at the same time; starting with the two center transducer elements 62a, 62b, each time another concentric transducer ring is added, the aperture of the array 60 is increased. In FIG. 6, one SIV 66 is shown being generated by the three innermost transducer elements 62a–62c, which thereby form the active elements in this configuration. Another SIV 68 that is farther away from the array 60 is created when all five transducer elements 62a–62e are excited.

The annular array illustrated in FIG. 6 is capable of creating a SIV, but not an arbitrarily oriented EIV. The annular array also requires mechanical steering in order to sweep the SIV across the region of interest. As such, the annular array is not optimal for applications such as where the heart moves rapidly, but may find use in flow detection in other vessels or organs of the body.

The distance at which the interrogation volume is focussed on transmit is also a function of the relative delay of excitation of the various transducer elements. Delay focusing is known in the art and it is known that by changing the relative phasing of the signals from the transducer elements, the results of the constructive interference that arises moves the focus of the array in and out. Using a smaller aperture (fewer concentric annular transducer elements), one is able to focus at a shorter distance while still maintaining the same f-number. As is described above, the invention is unique compared to what is known in that it provides a transducer that can generate, translate, (and, for EIV's, rotate) spherical and ellipsoidal interrogation volumes. The invention thereby allows for isotropic measurement of the flow.

Figure 7:
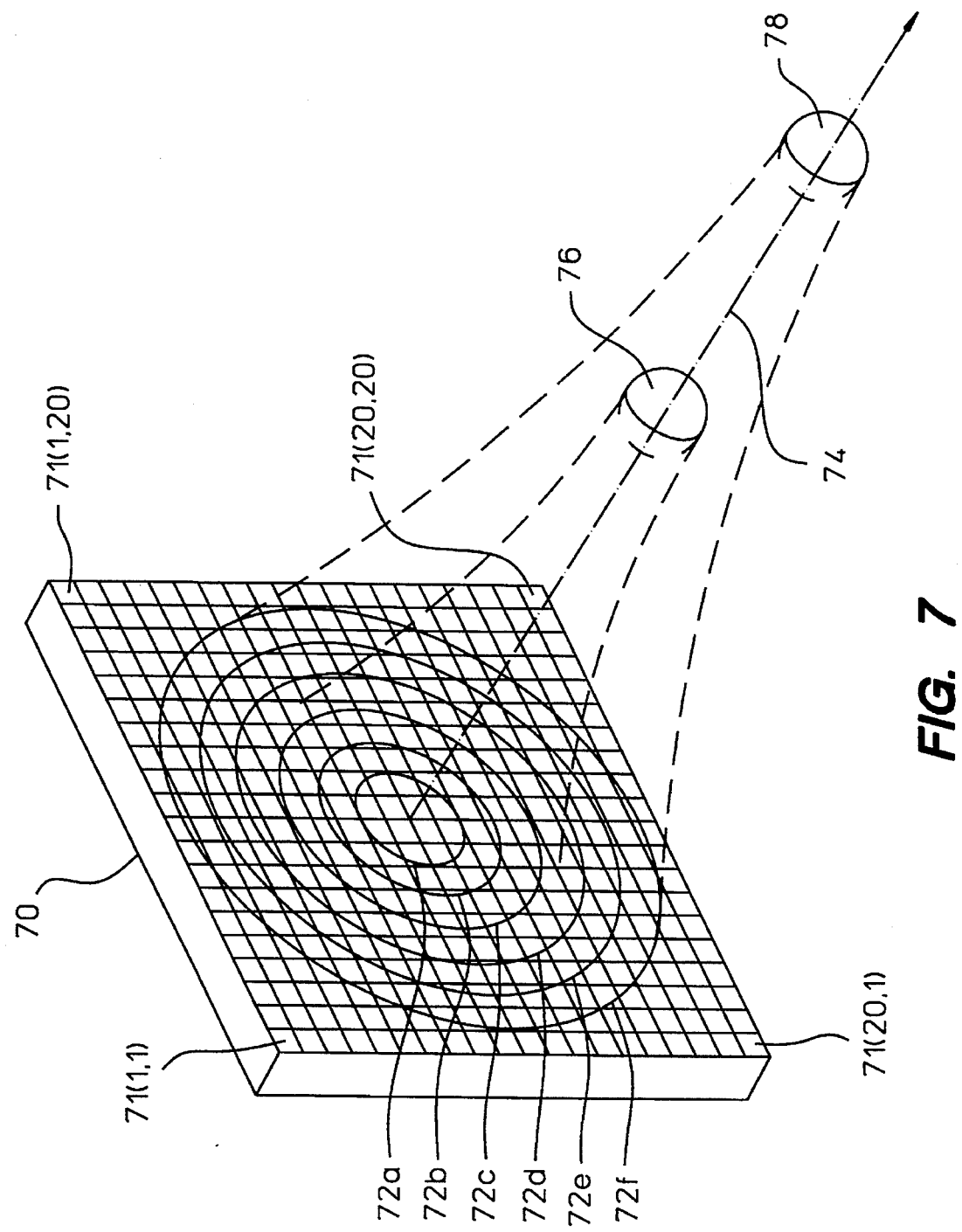
FIG. 7 illustrates a two-dimensional phased array of ultrasonic transducer elements that can be used to generate the SIV.

FIG. 7 illustrates a simplified 2-D phased array 70 of ultrasonic transducer elements. In the illustrated example, the array consists of 400 transducer elements arranged as a 20-by-20 matrix, whose corner elements are labeled as 71(1, 1), 71(1, 20), 71(20, 1), and 71(20, 20). The number of transducer elements used in any given application will depend on the desired degree of beam-forming and other factors such as allowable manufacturing complexity and cost. The individual elements 71 are separated from each other preferably using a dicing saw as is well known in the art.

Concentric rings 72a–f are shown superimposed on the face of the array 70 only for the purpose of explanation. According to the invention, the individual transducer elements of the 2-D phased array 70 are excited in such a way that the array 70 can simulate a system of annular transducer elements, but is also able to simulate other apertures. In operation, in order to simulate the innermost transducer element (within the ring 72a), all of the transducer elements within the region marked by the ring 72a, or that have at least some predetermined portion within the ring, are excited with the appropriately delayed excitation signals. Similarly, any other annular region is simulated by exciting those transducer elements that lie sufficiently within the corresponding annular region on the face of the array 70.

In the illustrated example, the 2-D phased array 70 is used to simulate on-axis focusing like that of the annular array shown in FIG. 6. Consequently, along the interrogation direction 74, different spherical interrogation volumes 76, 78 may be created depending on the diameter of the "aperture" created by the outermost simulated transducer "ring."

One of the advantages of the 2-D phased array 70 is that the number and diameters of the annular regions can be changed through a simple change in the electrical excitation signals, with no need for any mechanical changes. An additional advantage of the 2-D array 70 is that it also makes it possible not only to change the focal distance of the array but also to change the interrogation direction 74 and to modulate the eccentricity of the interrogation volumes. Depending on the physical properties of the transducer elements in the array 70, known analytical and numerical techniques, simulation, and experimentation can be used to determine excitation signals for the transducer elements that produce signals that constructively interfere to create and rotate ellipsoidal interrogation regions, as well as interrogation regions with other shapes. As is illustrated and described below for a preferred embodiment of the 2-D phased array, the invention can generate, move, and change interrogation volumes using purely electronic control.

Figure 8:
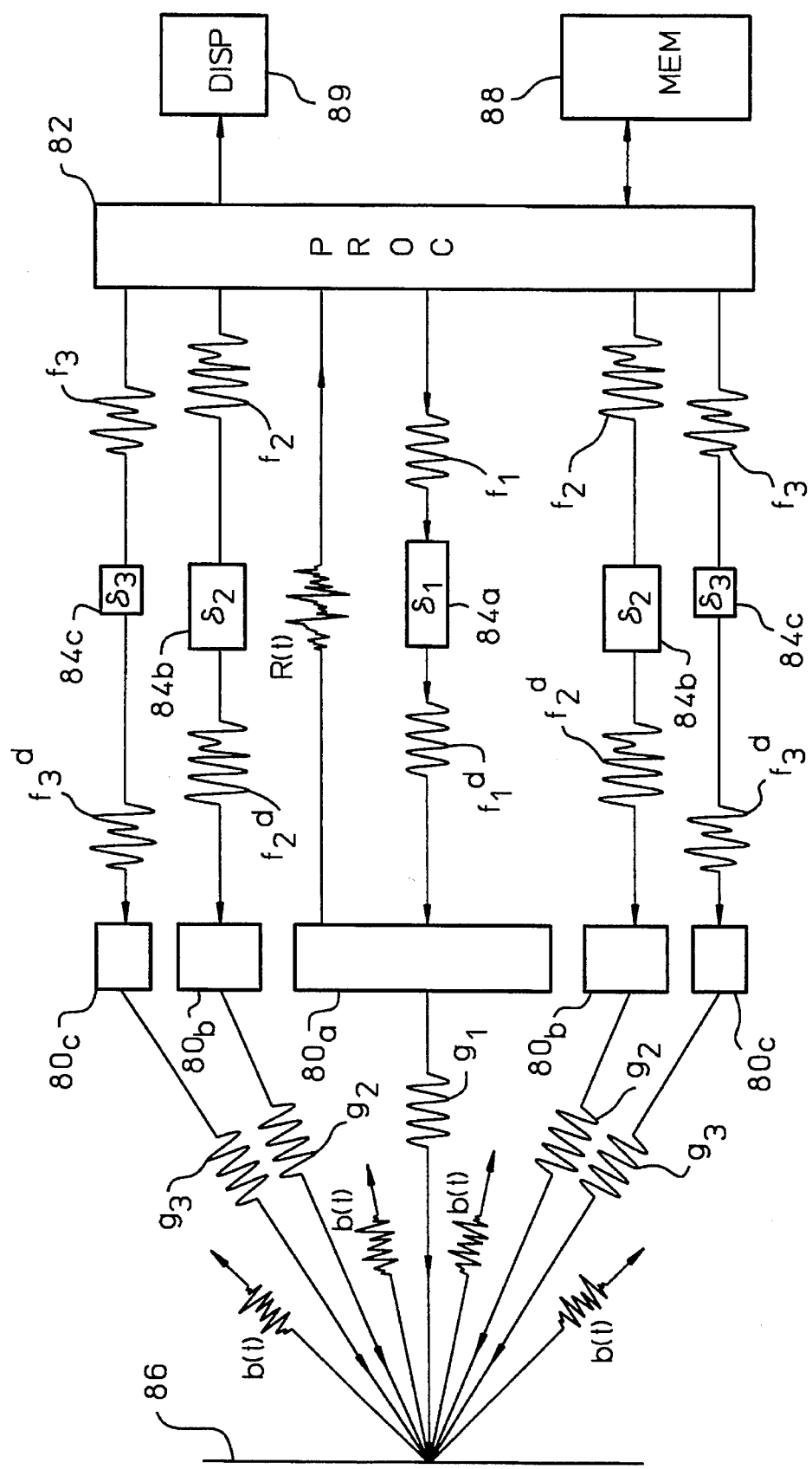
FIG. 8 shows a simplified block diagram of a system for generating interrogation volumes by varying the activation pattern of the transducer elements in the 2-D array and the timing/phase relationships of the respective transmit and receive signals for different groups of active transducer elements.

FIG. 8 is a schematic block diagram that shows the major components and signals of a system for measuring flow using an ultrasonic spherical interrogation volume. In FIG. 8, a configuration in which a simple 3-ring annular transducer array is simulated by activation of appropriate elements in a 2-D array is shown only for purposes of easy explanation. In FIG. 8, the three active regions of the array are labeled 80a, 80b, and 80c, each of which represents a group of transducer elements in the 2-D array that are activated with essentially the same transmit signal and whose receive signals are processed substantially as if they were a single transducer element. Although an emulation of a simple three-ring array is illustrated, the structure shown in FIG. 8 also applies in the more general case (described below) of emulation of an n-ring annular or n-elliptical transducer array, for which the various excitation signals (described below) will be provided for each transducer in the array.

Conventional processing circuitry 82 generates electrical excitation signals $f_1$, $f_2$, $f_3$ as a sequence of pulses to drive the piezoelectric elements of the transducer array. In the simplest single-frequency or "monochromatic" case, each excitation signal will take the form $f_i(t)=E_i(t)\cdot\cos(\omega t)$. The excitation signals $f_1$, $f_2$, $f_3$ are time-delayed by amounts $\delta_1$, $\delta_2$, and $\delta_3$, respectively, either in separate conventional delay circuits 84a, 84b, 84c or by the processing circuitry 82 itself as it generates the excitation signals $f_1$, $f_2$, $f_3$. The different piezoelectric transducer element groups 80a, 80b, 80c are excited by the respective delayed excitation signals $f_1^d$, $f_2^d$, $f_3^d$. Assuming that the excitation signals are single-frequency, the delayed excitation signals thus take the general form:

$$f_i^d = E_i(t)\cdot\cos\,[\omega\cdot(t-\delta_i)].$$

It is not necessary for the transducer excitation signals to be single-frequency; rather, as FIG. 8 shows for the excitation signals $f_2$ and $f_3$, the excitation signals may contain other frequency components so that the general form of the delayed excitation signals is:

$$f_i^d = (W_i,\,t,\,\delta_i)$$

where $W_i$ is a set of frequencies included in the spectrum of the respective excitation signal.

Time delay has been used above for discussing the focussing conditions. As is known in the art, however, phase mixing is also a suitable technique.

The transducer elements are excited by their respective input signals $f_i^d$ and emit corresponding ultrasonic output signals $g_1$, $g_2$, and $g_3$ that make up the interrogation signal and interfere with each other to focus the interrogation volume at a focal plane 86. Moving particles within the interrogation volume back-scatter the ultrasonic signal as a return signal $b(t)$. The back-scattered ultrasonic return signal is converted by one or more of the piezoelectric transducer element groups 80a, 80b, 80c into the electrical return signal $R(t)$, which is a composite of the electrical return signals generated by each of the transducer elements in the array. After conventional range gating and possibly other signal processing such as envelope detection, calculations to determine flow speed and direction (depending on the method used in a particular implementation) are carried out in the processing circuitry 82. In a multi-element transducer such as this invention, conventional beam-forming techniques are preferably used to combine the individual RF signals at each element into the composite RF signal $R(t)$ for range-gating and envelope detection, as required.

The processing circuitry 82 may contain or be connected to conventional signal generation and conditioning circuitry in order to create the excitation signals $f_1$, $f_2$, $f_3$ as a sequence of pulses that are repeated at a predetermined rate. Similarly, the processing circuitry 82 may contain or be connected to conventional receiving and conditioning circuitry that carries out such functions as pre-amplification, sampling, and analog-to-digital conversion, which transforms the return signals, either individually or as the composite $R(t)$, from the transducer elements into numerical values suitable for use in the calculations of fluid flow speed and direction. The processing circuitry 82 or additional receiver circuitry may also be provided to achieve spherically symmetrical round-trip beam-forming in the interrogation volume.

A memory circuit 88 is either connected to or is contained within the processing circuitry 82. The memory circuit 88 is used to accumulate the successive values of the return signal (shown as the composite return signal $R(t)$ in FIG. 8) that are used in the calculations of flow speed and direction. The memory circuit 88 may also be used, for example, to digitally store signal profiles that the processing circuitry 82 uses to generate the excitation signals $f_1$, $f_2$, $f_3$. The flow speed or direction results may be displayed to the user on any conventional alphanumerical, graphical or other display device 89 that is driven by an output of the processing circuitry 82. The output results may also be passed on to additional processing, evaluation, or application circuitry.

The invention provides a transducer that generates a spherical interrogation volume in order to determine flow magnitude independent of direction. The ultrasonic transducer output signals $g_1$, $g_2$, $g_3$ must therefore have signal forms that constructively interfere to create the spherical interrogation volume. The excitation signals to the transducer elements in the 2-D array may also have such signal waveforms that the constructive interference of the ultrasonic output signals from the transducer elements creates ellipsoidal interrogation volumes. This is described further below.

As is mentioned above, the envelope E(t) of the output signals from the ultrasonic transducer elements is such that, for an SIV, the range dimension is set equal to the azimuth and elevation dimensions of the interrogation volume. In determining the output signals required from the various transducer elements, one must keep in mind that the envelope E(t) of an output signal from a transducer will be substantially the same as the envelope of its excitation signal only if the transducer is sufficiently "fast," or broadband. In general, however, the envelope of the output signal from a transducer element will not be exactly the same as the envelope of the excitation signal that forms the electrical input to the piezoelectric transducer element.

The "slower" a transducer element is, the greater the degree of change will be, especially for input excitation signals that have more than one component frequency. As is well known, the characteristics of the output signal will depend on the impulse response characteristics of the corresponding transducer. Since one knows or can calculate the characteristics of the output signal that are required to generate the spherical or elliptical interrogation volumes according to the invention, it is possible to determine the required excitation signals either theoretically by deconvolution (assuming one knows or can estimate the impulse response function of each transducer), by simulation, or by experimentation. The parameters necessary to generate the corresponding signals may be stored in the memory circuit 88 for use by the processing circuitry 82 in generating the excitation signals $f_1$, $f_2$, $f_3$, not only for a given SIV, but also for the position in space of the SIV, or the position, orientation, and eccentricity of elliptical interrogation volumes.

As is mentioned above, it will typically not be possible to generate a perfectly spherical interrogation volume, but experiments have indicated that a sufficiently spherical interrogation volume for most applications can be generated by creating a wave envelope with a Gaussian range profile of appropriate width. In particular, according to the invention, the array (either a structurally annular as in FIG. 6 or an "emulated" annular array as in FIGS. 7 and 11) is configured as a pattern of concentric circular transducer elements for the case of on-axis focussing. The functional array elements are then activated by appropriate timing and phasing to generate an interrogation volume that is approximately cylindrical. The range dimension of the cylinder is then adjusted to be equal to the lateral dimensions and the "edges" of the cylinder are then "rounded," for example, by using a Gaussian range profile.

Figure 9:
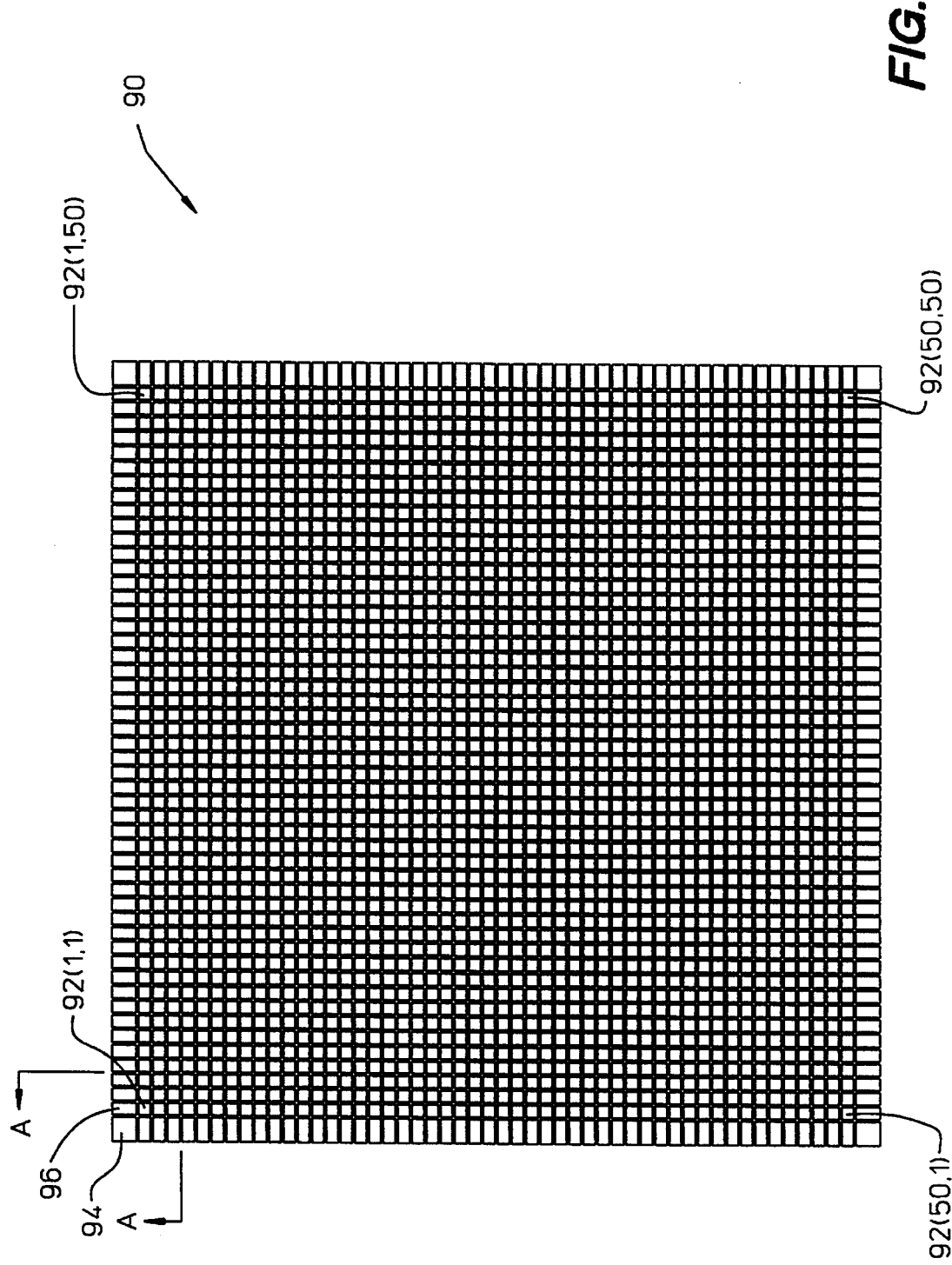
FIG. 9 illustrates the layout of a 2-D array according to the invention, with 2500 functional transducer elements.

FIG. 9 illustrates a preferred embodiment of a 2-D array 90 of ultrasonic transducer elements that is suitable for generating both SIV's and EIV's. In this embodiment, 2500 functional transducer elements are arranged as a 50×50 array. The functional elements are those that can be activated by electronic transmit signals and that can receive back-scattered return signals from the interrogation volume. The corner functional elements in the array 90 are labelled 92(1, 1), 92(1, 50), 92(50, 1), and 92(50, 50).

The transducer elements in an outer inactive area around the edge of the array 90 are non-functional guard elements, which, for ease of construction, are preferably formed as portions of the same substrate on which the functional elements are manufactured. In FIG. 9, 204 guard elements are shown, including the corner guard element 94 (at the upper left corner) and the edge guard element 96 (immediately to the right of the corner guard element 94). As their name implies, the guard elements protect the functional elements from damage during manufacturing and handling. They also allow the outermost functional elements to be manufactured using the same manufacturing procedures as the inner functional elements (their outer edges will not be subjected to a different cutting procedure). The guard elements may also be used to provide points of electrical and mechanical contact for other circuitry.

The number of functional and guard elements in the array 90 need not be 2500 and 204, respectively, but may be varied depending on the needs, such as size, resolution, cost, and manufacturing complexity, of a given implementation. Although it is preferable in order to provide the greatest available range of circular apertures, it is also possible to arrange the array in other shapes than a square. In other words, instead of arranging the functional elements as an n-by-n array, they could be arranged as an n-by-m rectangle (m≠n), in the shape of some other polygon, or even with curved boundaries.

In the preferred embodiment, the array operates at a center frequency in the range of 1.0 to 50.0 MHz and has a pitch P (element spacing) such that P≦λ/2, where λ is the acoustic wavelength in the medium of propagation. This means that the transducer elements 92 in the array 90 are no larger than half the acoustic wavelength, so that the inner 50×50 active area of the array 90 is 25λ×25λ in size. This preferred spatial sampling satisfies both the requirement to produce a sufficient approximation to a spherical or elliptical array aperture and also the more conventional requirement to avoid grating lobes in the beam profile of the phased array.

Figure 10:
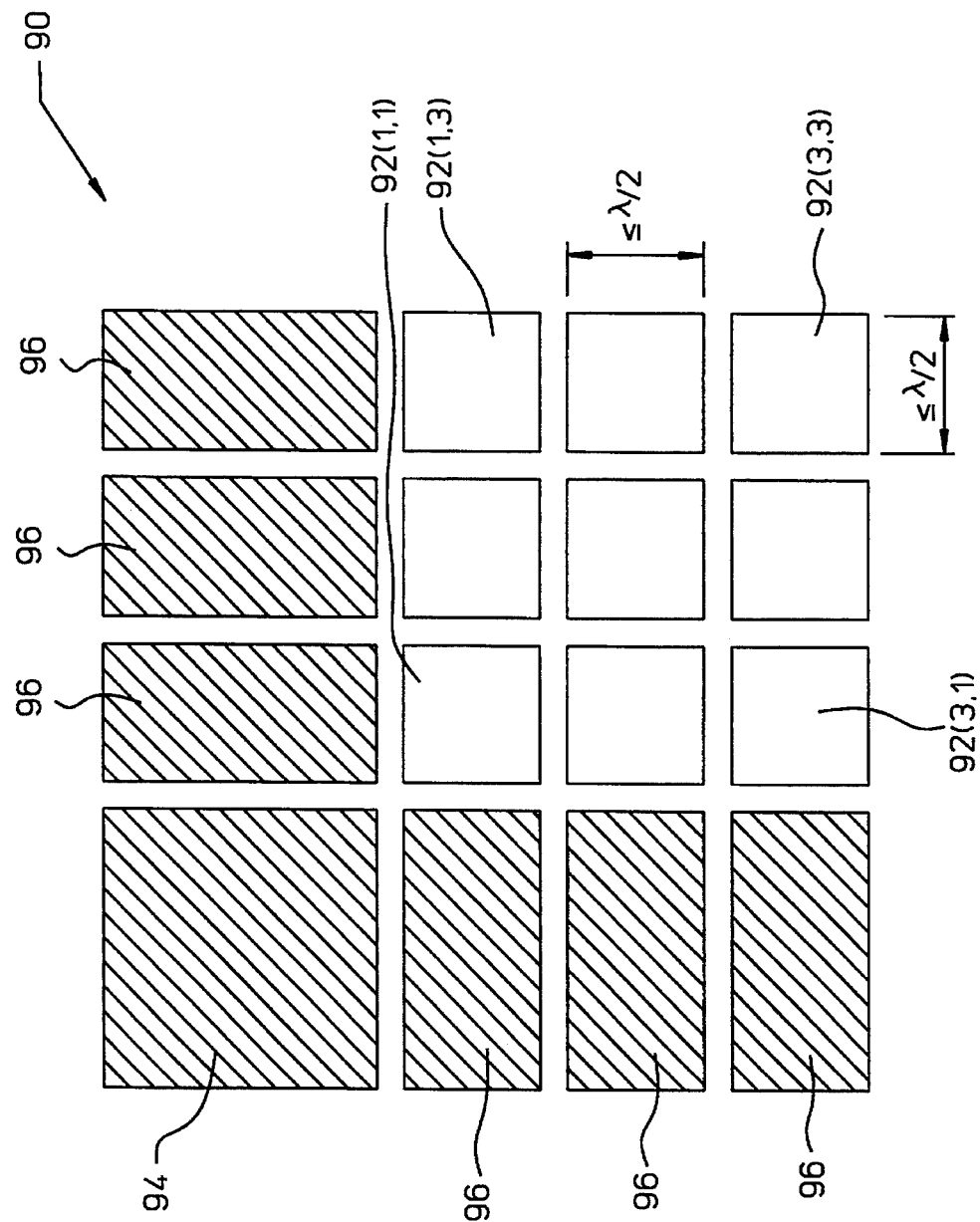
FIG. 10 illustrates both active and inactive transducer elements in a portion (section A—A) of the array of FIG. 9.

FIG. 10 shows the upper left corner of the array (portion A—A of FIG. 9). Non-functional guard elements (corner element 94 and edge elements 96) are shown shaded, and nine functional elements 92(1, 1), . . . , 92(1, 3), . . . , 92(3, 1), . . . , 92(3, 3) are shown without shading. The guard "edge" of the array (including the corner elements 94 and edge elements 96) is preferably at least twice as wide as the size of a functional element 92 in order to provide sufficient structural protection for the functional elements. Thus, in FIG. 10, the corner element 94 is twice as long on each side as a functional element, while the edge elements extend outward twice as far as the length of a side of a functional element but are equally as wide along the edge of the array.

In the preferred embodiment, the 2-D array includes not only a piezoelectric resonator layer, but also a front matching layer to optimize the forward power transfer, and a backing layer to attenuate the rearward acoustic signal. The required properties of both the matching and back layers are well known in the art.

Figure 11:
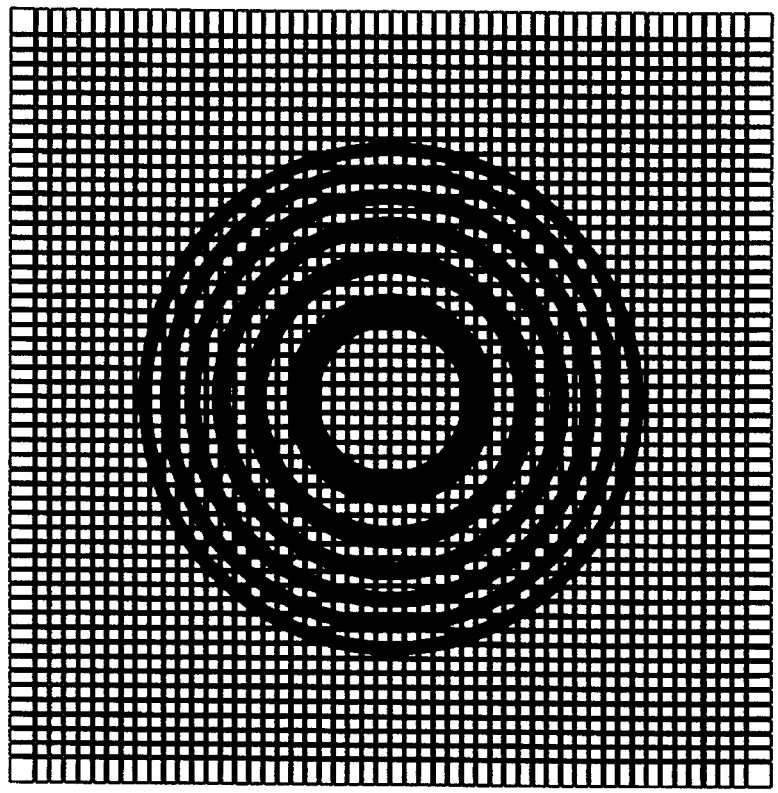
FIG. 11 illustrates an on-axis element activation pattern of concentric circles for generating an SIV.

To achieve an SIV, the effective aperture of the 2-D array 90 must be circular as viewed from the point of interrogation. This means that when the interrogation beam is focussed on-axis, the aperture is circular and when the beam is steered off-axis, the aperture needs to be elliptical. FIG. 11 illustrates, for the sake of simplicity only, a set of 12 concentric circular apertures (alternately shaded and non-shaded for clarity) steered on-axis. At near ranges the smaller apertures are used (fewer outer "rings" are activated), and as the range increases the aperture expands by activating more annular element regions or patterns with larger diameter. The boundaries of the contours of the apertures are determined by the condition that each contour should span a constant phase shift.

Figure 12:
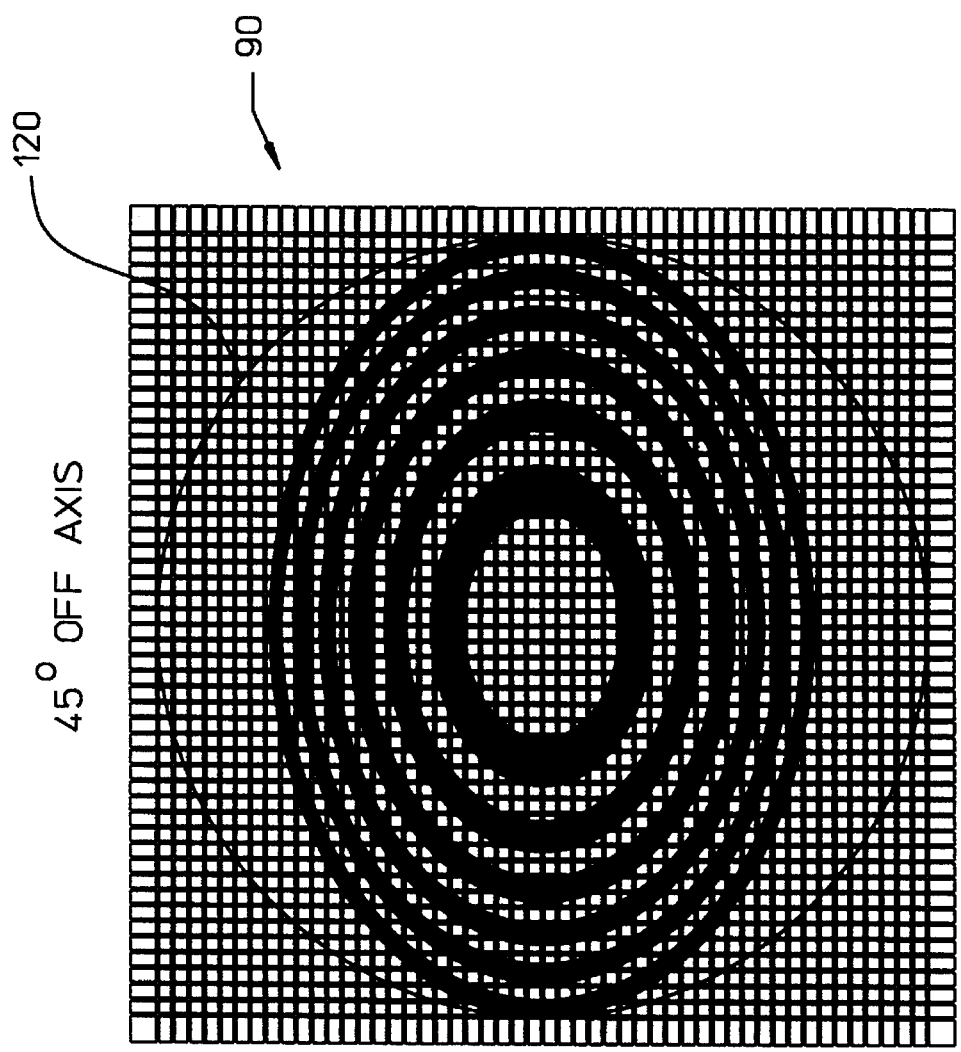
FIG. 12 illustrates an activation pattern configured for 45° off-axis, centered steering of the array.

FIG. 12 illustrates an equivalent element activation pattern for steering the array 90 at 45° in the azimuthal plane. Here, the ellipse provides a circular aperture as viewed from 45° off-axis. The circle 120 shown in the figure represents the set of long axes for scanning in arbitrary planes. The degree of eccentricity that the elliptical element activation patterns must have to project as a circle onto a given interrogation focal plane may be determined using known methods such as wellknown equations for conic sections.

The choice of twelve concentric apertures shown in FIGS. 11 and 12 is simply for the sake of illustration. In practice, the 2-D phased array can have more or fewer concentric apertures depending on the specific measurement requirements. One great advantage of the invention is that the aperture can be changed without any need to make mechanical changes; rather, the apertures can be changed simply by activating more or fewer or different transducer elements, that is, by electronically applying appropriate transmit and receive signals to the elements using the same mechanical and electrical structure.

The 2-D array according to the invention is also capable of providing an offset to the center of the set of concentric apertures in order to control the direction of interrogation. This is accomplished by dynamically shifting (translating) the center of the concentric apertures; this makes it much easier to scan through the "keyhole" formed by the ribs in a transthoracic scan. This type of dynamic control of an SIV is not possible using conventional annular or one-dimensional arrays.

Figure 13:
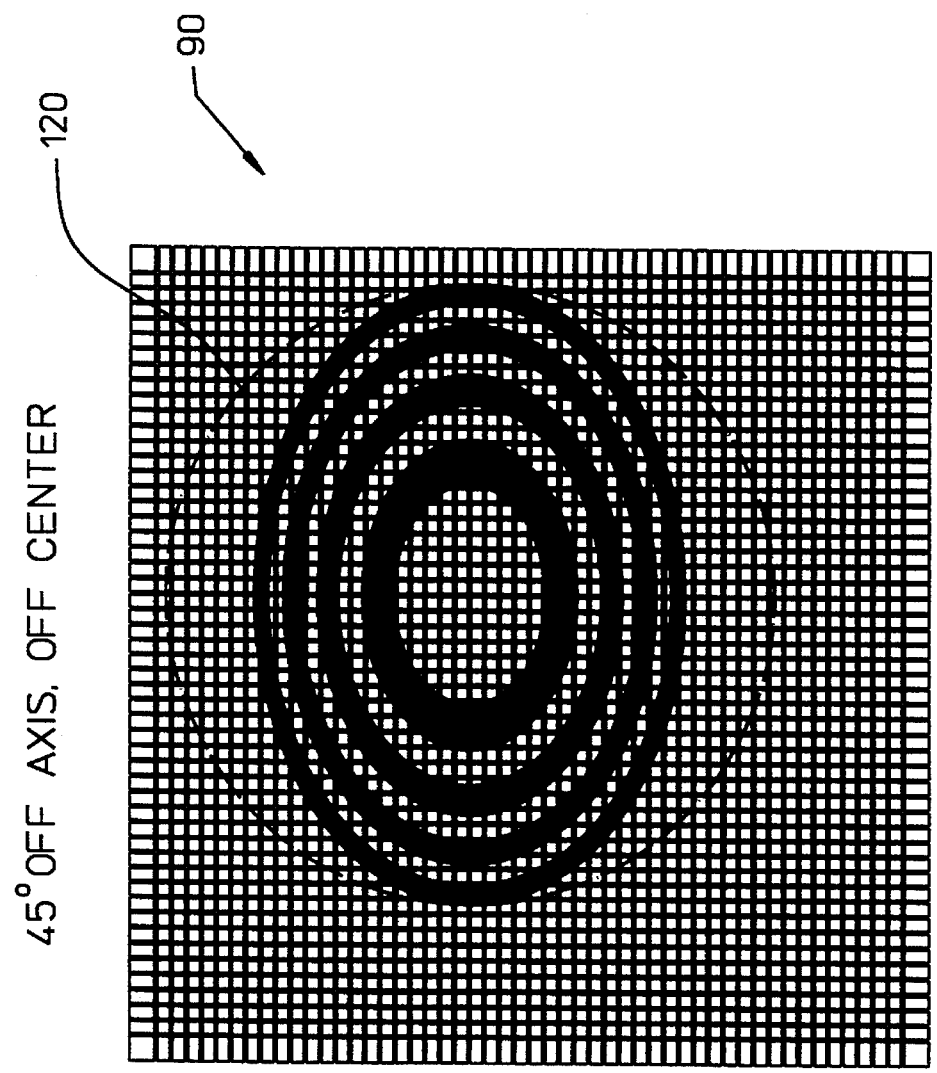
FIG. 13 illustrates an activation pattern configured for 45° off-axis, off-center steering of the array.

FIG. 13 illustrates the case of a 45° off-axis scan with an off-center displacement in both the x- and y-directions (in the figure, the center of the elliptical activation regions is moved both upward and to the right relative to the center in FIG. 12). FIG. 13 also illustrates that the number and size of concentric apertures can be changed: an activation pattern with eight apertures instead of twelve is illustrated in FIG. 13.

In FIG. 8, each transducer element group 80a, 80b, 80c corresponds to the elements in one of the concentric apertures in a simple three-aperture configuration. Of course, transmit and receive signals will similarly be applied to and then collected from each of the n element groups in the more general n-aperture case. The return signal R(t) then represents the composite signal from all active elements in the array.

We claim:

1. A system for measuring blood flow within a blood vessel or organ comprising:
    A. an array of piezoelectric transducer elements;
    B. signal generation, sensing, and conditioning means:
        1. for electronically grouping the transducer elements into a pattern of concentric active aperture regions;
        2. for individually and repeatedly applying to the transducer elements in each active aperture region a corresponding pulsed electrical transmit signal to generate a substantially isotropic and spherical ultrasonic interrogation volume within which blood flow is to be measured; and
        3. for sensing an ultrasonic return signal that is back-scattered from particles within the interrogation volume; and
    C. processing means for calculating an estimate of a predetermined characteristic of blood flow as a predetermined function of the return signal.

2. A system as defined in claim 1, in which the array is a two-dimensional phased array.

3. A system as defined in claim 2, in which the aperture regions are substantially circular and the interrogation volume is focussed on an array axis that is substantially perpendicular to the array.

4. A system as defined in claim 1, in which the piezoelectric transducer elements are annular and concentric.

5. A method for measuring blood flow within a blood vessel or organ comprising:
    A. electronically grouping a plurality of piezoelectric transducer elements into a pattern of concentric active aperture regions;
    B. individually and repeatedly applying to the transducer elements in each active aperture region a corresponding pulsed electrical transmit signal to generate an ultrasonic interrogation volume within which blood flow is to be measured;
    C. sensing an ultrasonic return signal that is back-scattered from particles within the interrogation volume;
    D. calculating an estimate of a predetermined characteristic of blood flow as a predetermined function of the return signal;
    E. defining an interrogation boundary condition; and
    F. generating the interrogation volume substantially as an isotropic sphere as measured according to the boundary condition.

6. A method as defined in claim 5, in which the array is a two-dimensional phased array.

7. A method as defined in claim 6, further including the following steps:
    A. grouping and activating the transducer elements as a pattern of substantially circular aperture regions; and
    B. focussing the interrogation volume at a variable distance from the array along an array axis that is substantially perpendicular to the array.

8. A method as defined in claim 7, in which the interrogation direction is offset from a center of the array.

9. A method as defined in claim 6, further including the following steps:
    A. grouping and activating the transducer elements as a pattern of substantially elliptical and concentric aperture regions; and
    B. focussing the interrogation volume at a variable distance from the array along an interrogation direction that is at a positive angle away from an array axis that is substantially perpendicular to the array.

10. A system for measuring blood flow within a blood vessel or organ comprising:
    A) a two-dimensional phased array of piezoelectric transducer elements;
    B) signal generation, sensing, and conditioning means:
        1) for electronically grouping the transducer elements into a pattern of substantially elliptical concentric active aperture regions;
        2) for individually and repeatedly applying to the transducer elements in each active aperture region a corresponding pulsed electrical transmit signal to generate an ultrasonic interrogation volume within which blood flow is to be measured; and 3) for sensing an ultrasonic return signal that is back-scattered from particles within the interrogation volume;

C) processing means for calculating an estimate of a predetermined characteristic of blood flow as a predetermined function of the return signal;

in which:

D) the interrogation volume is focussed along an interrogation direction that is at a positive angle to an array axis, which is substantially perpendicular to the array.

11. A system as defined in claim 10, in which the interrogation direction is offset from a center of the array.

12. A system as defined in claim 10, in which the interrogation volume is substantially isotropic and spherical.

13. A system as defined in claim 10, in which the transducer elements are arranged in the array with a pitch that is no greater than one-half an acoustic wavelength in a medium of propagation.

14. A system for measuring blood flow within a blood vessel or organ comprising:

A) a two-dimensional phased array of piezoelectric transducer elements;

B) signal generation, sensing, and conditioning means:
1) for electronically grouping the transducer elements into a pattern of concentric active aperture regions;
2) for individually and repeatedly applying to the transducer elements in each active aperture region a corresponding pulsed electrical transmit signal to generate an ultrasonic interrogation volume that is substantially ellipsoidal, which has a long axis direction, and within which blood flow is to be measured; and
3) for sensing an ultrasonic return signal that is back-scattered from particles within the interrogation volume; and C) processing means:
1) for calculating an estimate of a predetermined characteristic of blood flow as a predetermined function of the return signal;
2) for sensing a minimum value of the predetermined function of the return signal for different orientations of the long axis direction; and
3) for indicating the direction of blood flow within the interrogation volume as being the same as the long axis direction corresponding to the sensed minimum value of the predetermined function of the return signal.

15. A system as defined in claim 14, in which the transducer elements are arranged in the array with a pitch that is no greater than one-half an acoustic wavelength in a medium of propagation.

16. A system for measuring blood flow within a blood vessel or organ comprising:

A) a two-dimensional phased array of piezoelectric transducer elements, including guard elements arranged around an edge of the array;

B) signal generation, sensing, and conditioning means:
1) for electronically grouping the transducer elements into a pattern of concentric active aperture regions;
2) for individually and repeatedly applying to the transducer elements in each active aperture region a corresponding pulsed electrical transmit signal to generate an ultrasonic interrogation volume within which blood flow is to be measured; and
3) for sensing an ultrasonic return signal that is back-scattered from particles within the interrogation volume; and C) processing means for calculating an estimate of a predetermined characteristic of blood flow as a predetermined function of the return signal.

17. A method for measuring blood flow within a blood vessel or organ comprising:

A) electronically grouping and activating a plurality of piezoelectric transducer elements in a two-dimensional phased array into a pattern of concentric, substantially circular active aperture regions;

B) individually and repeatedly applying to the transducer elements in each active aperture region a corresponding pulsed electrical transmit signal to generate an ultrasonic interrogation volume within which blood flow is to be measured;

C) sensing an ultrasonic return signal that is back-scattered from particles within the interrogation volume;

D) calculating an estimate of a predetermined characteristic of blood flow as a predetermined function of the return signal;

E) defining an interrogation boundary condition;

F) generating the interrogation volume substantially as an ellipsoid, which has a long axis direction, as measured according to the boundary condition;

G) reorienting the long axis direction;

H) sensing a minimum value of the predetermined function of the return signal for different orientations of the long axis direction; and I) indicating the direction of blood flow within the interrogation volume as being the same as the long axis direction corresponding to the sensed minimum value of the predetermined function of the return signal.

* * * * *